United States Patent

Rosenburgh

[15] 3,698,654

[45] Oct. 17, 1972

[54] SELF-THREADING TAKE-UP DEVICE

[72] Inventor: Norman John Rosenburgh, Rochester, N.Y.

[73] Assignee: Eastman Kodak Company, Rochester, N.Y.

[22] Filed: Nov. 27, 1970

[21] Appl. No.: 93,205

[52] U.S. Cl. ....................................242/74, 242/71.8
[51] Int. Cl. ..............................................B65h 75/28
[58] Field of Search.....242/74, 74.1, 74.2, 71.8, 195, 242/210, 76, 71.9, 73; 352/157, 158

[56] References Cited

UNITED STATES PATENTS 3,323,746 6/1967 Mouissie...................242/74.2

*Primary Examiner*—Stanley N. Gilreath
*Assistant Examiner*—Gregory A. Walters
*Attorney*—Robert W. Hampton and John D. Husser

[57] ABSTRACT

A self-threading strip take-up hub, adapted to wind thereabout web-like strips of different widths, is provided with a flexible snubber member extending from the hub for respectively securing the leading ends of such strips to the hub at a location opposite a predetermined point on the winding axis of the hub. Several pairs of flexible guide members extend from the take-up hub with each of the guide members forming a particular pair attached to the hub respectively at locations equidistant in opposite axial directions from the predetermined point on such hub axis. The guide members of a particular pair are separated by a distance slightly greater than the width of a corresponding one of the strips to guide the same for winding about the take-up hub centered on such predetermined axial point.

12 Claims, 5 Drawing Figures

NORMAN J. ROSENBURGH
INVENTOR.
BY John D. Husser
R.L. Hampton
ATTORNEYS

NORMAN J. ROSENBURGH
INVENTOR.
BY John D. Husser
R. L. Hampton
ATTORNEYS

SELF-THREADING TAKE-UP DEVICE

CROSS REFERENCE TO RELATED APPLICATION

Reference is made to commonly assigned copending U.S. Pat. application Ser. No. 730,223, now U.S. Pat. No. 3,528,628, entitled "Convertible Record Viewer or the Like," filed in the name of Elmer O. Wangerin on May 20, 1968.

BACKGROUND OF THE INVENTION

1. Field of the Invention

The present invention relates to self-threading take-up devices for receiving strips of different widths, and more particularly to a self-threading take-up hub or reel which is adapted for winding thereabout the different width strips in a manner whereby their longitudinal center lines are respectively aligned with a common point on the winding axis of the hub or reel.

2. Description of the Prior Art

It is well known in the art of web handling to provide a flanged take-up reel with a snubber member which can engage a strip end that is fed between the reel flanges during winding rotation of the reel. When engaged by such a snubber member, the strip end is automatically secured to the reel hub in response to rotation of the reel, and the secured strip is then wound onto the hub to form a strip roll. These previously known self-threading take-up reels, however, are not generally suited to receive strip material of widths that are substantially narrower than the distance between the reel flanges as such flanges are ineffective to maintain successive convolutions of a winding strip roll in lateral alignment. Therefore, in the absence of some strip edge-guiding surface for laterally maintaining alignment of the successively formed convolutions of the narrower strip, the inherent strip curl and the influence of the snubber member almost certainly results in overlapping misalignment of these convolutions. Accordingly, it has been necessary to use different reels of appropriate flange spacing for the particular width strip which is to be wound onto the take-up reel.

Recently, a self-threading take-up reel has been devised which, as disclosed in commonly assigned U.S. Pat. No. 3,521,829, is capable of receiving strips of different widths without the problems of lateral misalignment as previously described. Briefly stated, this reel is provided with a flexible snubber member extending from the reel hub at a location adjacent one of the reel flanges and is further provided with a flexible guide member extending from the hub at a location adjacent the other flange. When the free end of a strip corresponding in width to the axial spacing of the reel flanges is fed between the flanges of the rotating reel, such strip end is engaged by the snubber member and both the snubber member and the guide member are wrapped around the reel hub beneath the resulting strip roll. Alternatively, when the free end of a strip of narrower width is fed between the same reel flanges, the flexible guide member causes such strip end to be engaged by the snubber member immediately adjacent the corresponding reel flange and thereafter laterally guides the winding of the strip to maintain the resulting strip roll in close proximity to that flange.

The self-threading take-up reel disclosed in U.S. pat. No. 3,521,829 can accommodate web-like strips of different widths and will maintain lateral alignment of the strip convolutions as such convolutions are successively formed; however, from the preceding description of such reel it will be appreciated that the different width strips, owing to the relative arrangement of the snubber member and the guide member, are wound onto the reel hub with one strip edge positioned against a flange of the reel so that the longitudinal center lines of such strips are respectively coiled about different points on the winding axis of the hub. Consequently, the longitudinal center lines of the different width strips do not move along a common line during strip feed and if an element disposed in the strip feed path leading to such reel is required to operate in a centered relation with respect to the longitudinal center line of each different width strip, it becomes necessary to readjust that element for centering every time a different width strip is utilized. An example of this consequence is illustrated in commonly assigned copending U.S. Pat. application Ser. No. 730,223, now U.S. Pat. No. 3,528,628, entitled "Convertible Record Viewer or the Like," filed in the name of Elmer O. Wangerin on May 20, 1968. Such patent application describes a film gate that must be adjusted for centering about the longitudinal center lines of 16mm or 35mm filmstrips according to which of these strips is being fed past the film gate and onto a self-threading take-up reel.

Accordingly, it can be seen that a need exists for a self-threading take-up device, such as a reel or a hub, which is capable of receiving strips of different widths and which is adapted to wind the strips in a manner such that their corresponding longitudinal center lines are respectively aligned and coiled about a common point on the winding axis of the reel or hub. Such a take-up hub or reel can, for example, be permanently incorporated in a film viewer adapted to display 8mm, 16mm and 35mm filmstrips since there would be no requirement to change the hub or reel according to the particular width filmstrip being viewed. Moreover, this take-up hub or reel would not require the position of a film gate in the film viewer to be readjusted, once located, for centering on the longitudinal center line of a particular width filmstrip being viewed, since the center line of all such strips could be fed along a common line.

SUMMARY OF THE INVENTION

It is therefore an object of the present invention to provide a novel and improved take-up device, such as a hub or a reel, for receiving strips of different widths in a winding direction.

It is a further object of the present invention to provide a self-threading take-up device which is adapted to wind strips of different widths in a manner so that the longitudinal center lines thereof are respectively coiled about a common point on the winding axis of the device.

In accordance with a preferred embodiment of the present invention, a self-threading take-up hub is adapted to receive thereabout in a winding direction web-like strips of different widths. The take-up hub is provided with a flexible snubber member extending therefrom for engaging and securing the leading ends of such strips respectively to the hub at a location opposite a predetermined point on the winding axis of the hub. At least one pair of flexible guide members extend from the take-up hub with each of the guide members forming such a pair attached to the hub respectively at equal distances in opposite axial directions from the predetermined point on the winding axis of the hub. The guide members of a particular pair are axially spaced apart by a distance slightly greater than the width of a corresponding one of the strips to guide the same for winding about the take-up hub centered on the predetermined axial point. Accordingly, upon rotation of the take-up hub about the winding axis, the snubber member secures an engaged strip to the hub with the longitudinal center line of such strip aligned on the predetermined axial point, and an appropriate pair of the guide members guide the secured strip for winding about the hub without lateral misalignment of the successively forming strip convolutions. The snubber member, and any pairs of guide members axially spaced apart from each other a distance less than the width of the winding strip, are wound about the take-up hub beneath the resulting strip roll.

BRIEF DESCRIPTION OF THE DRAWINGS

The above-mentioned and other features and objects of the present invention and the manner of obtaining them will be more apparent by reference to the following detailed description of the preferred embodiment of such invention taken in conjunction with the accompanying drawings, wherein.

DESCRIPTION OF THE PREFERRED EMBODIMENT

Figure 1:
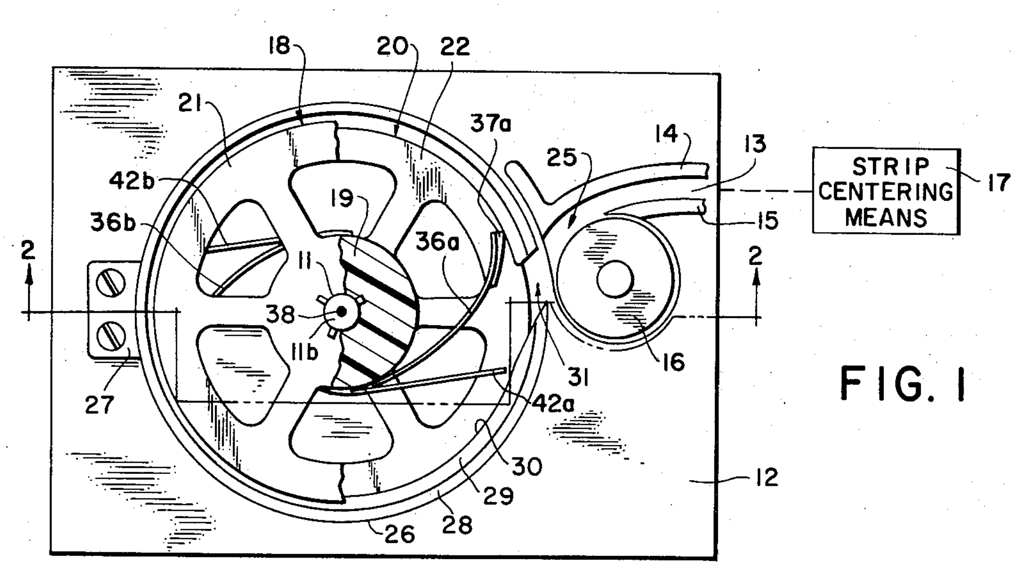
FIG. 1 is a partially broken away plan view of a self-threading strip take-up reel according to a preferred embodiment of the present invention mounted on an appropriate support portion of a strip handling apparatus.
Figure 2:
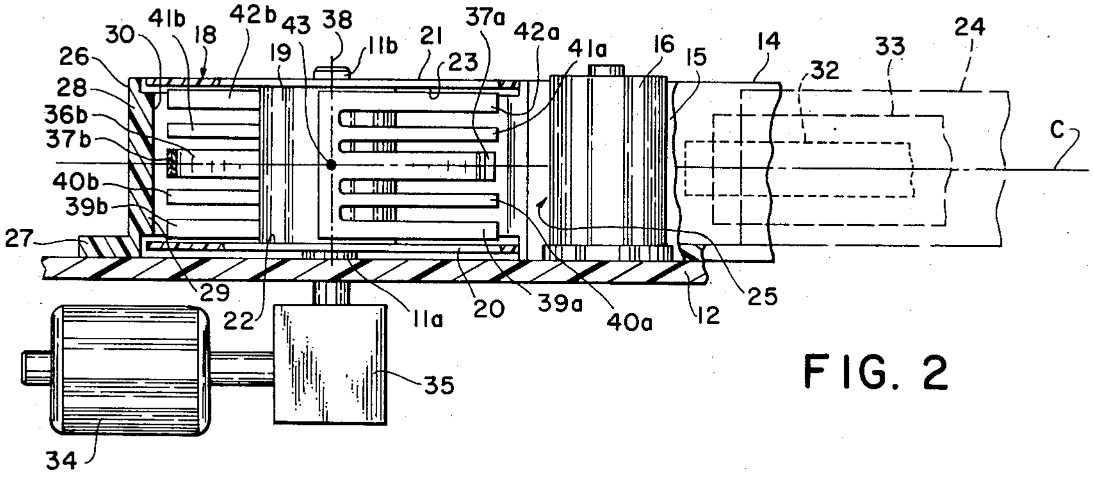
FIG. 2 is a front elevational view of the reel and support shown in FIG. 1, cross sectioned along the line 2—2 of FIG. 1 and further schematically illustrating in broken lines the manner by which the reel is adapted to receive strips of relatively wide, intermediate and narrow widths.

Before proceeding with a description of the self-threading take-up hub or reel to which the present invention is specifically directed, it may be well to first describe in brief one form of a support structure on which the hub or reel can be mounted. With reference to FIGS. 1 and 2, such support is provided with a take-up spindle 11 rotatably mounted on a stationary plate 12 and with a guide channel 13 defined by guide wall members 14 and 15 and by idler roller 16. As illustrated in FIG. 1, the entrance to the guide channel is aligned with a commonplace strip centering means 17 of the kind typically illustrated in U.S. Pat. Nos. 2,225,276 and 3,518,739, whereby a strip of web material fed into the channel entrance will be guided along a fixed path toward the spindle 11 and can be axially centered with respect to the opposed ends **11*a* and 11*b*** of such spindle regardless of the strip width.

Considering now a preferred embodiment of the present invention, there is shown in FIGS. 1 and 2, a self-threading strip take-up reel 18 mounted on and rotatable with the take-up spindle 11. At opposite ends of its generally cylindrical hub member 19, the reel 18 is provided with circular lower and upper flange members 20 and 21; the respective flat internal surfaces 22 and 23 of which are spaced apart by a distance only slightly greater than the width of a 35mm filmstrip 24 to guide the same for winding onto such hub (FIG. 2). However, it will be understood from the description hereinafter than the hub member 19 can operate without the addition of such flange members.

As most clearly shown in FIG. 2, the reel 18 can be positioned in axial relation to the take-up spindle 11 so that the internal surface 22 of the lower reel flange 20 is even with or just slightly below the plane defined by a bottom surface 25 of the guide channel 13. A guide rim member 26 is immovably attached to the support plate 12 by a mounting lug 27 and includes a generally cylindrical rim 28 located circumferentially about the reel 18, see FIG. 1. This rim 28 is provided with an internal lip 29, which projects inwardly between the edges of the reel flanges 20 and 21 to define an internal cylindrical strip guide surface 30 surrounding the reel hub member 19 except in the region of opening 31. With reference to FIG. 1, it will be seen that the opening 31 extends through the rim 28 in alignment with the corresponding end of the guide channel 13 to provide access to the reel hub 19.

As the 35mm filmstrip 24 or another filmstrip of a narrower width, such as the 8mm filmstrip 32 or the 16mm filmstrip 33, is fed past the strip centering means 17 and into the guide channel 13 from a suitable strip supply reel (not shown), the self-threading take-up reel 18 is simultaneously driven in a winding direction, i.e., clockwise as viewed in FIG. 1, so that the peripheral speed of the reel hub member 19 exceeds the longitudinal speed of the filmstrip moving toward such reel. The drive means by which this is accomplished is represented in FIG. 2 as comprising a suitable motor 34 connected to the reel spindle 11 through an appropriate gear and friction clutch unit 35. Accordingly, as the leading, i.e. free, end of the filmstrip emerges from the end of the guide channel 13, it enters opening 31 in the generally cylindrical rim 28 and is introduced between the flanges 20 and 21 of the rotating reel 18. Furthermore, as will become significant hereinafter, the strip centering means 17 serves to respectively position the filmstrips so that the introduced strip end is disposed intermediate the reel flanges regardless of the strip width, and the longitudinal center line C of each such strip is aligned with the same point 43 on the hub member axis 38, see FIG. 2.

To secure the leading end of either of the filmstrips 24, 32 or 33 to the hub member 19 of the reel 18, snubber members or fingers **36*a* and 36*b* formed of a thin flexible material, such as phosphor bronze or a synthetic plastic, are attached to and extend outwardly from opposite sides of the reel hub in generally tangential relation thereto at respective locations intermediate, i.e., midway between, the reel flanges 20 and 21. At their outer ends, the snubber members 36***a* and 36*b* are respectively pads 37*a* and 37*b* made of sponge rubber or some other suitable relatively soft material having a high coefficient of friction with respect to the filmstrip material. When the reel 18 is empty and is rotated in the winding direction, i.e., clockwise as shown in FIG. 1, about its winding axis 38, these pads 37*a* and 37*b* are moved along the cylindrical internal surface 30 of the rim 28 and are maintained in resilient contact therewith by the resiliency of the rearwardly bowed snubber members 36*a* and 36*b*.

Strip provided with friction guide members 39*a*, 39*b*, 40*a*, 40*b*, 41*a*, 41*b* and 42*a*, 42*b* are attached to the reel hub 19 and extend tangentially therefrom at either side of such hub in axial alignment with the corresponding snubber members 36*a* and 36*b*, see FIGS. 1 and 2. These guide members are formed of the same resiliently flexible material used to form the snubber members, preferably by combining the guide members 39*a*, 40*a*, 41*a* and 42*a* with the corresponding snubber member 36*a* as a one-piece bifurcated element and by likewise combining the guide members 39*b*, 40*b*, 41*b* and 42*b* with the corresponding snubber member 36*b* as shown in FIG. 2. It should be noted, however, that the strip guide members terminate short of the cylindrical internal surface 30 of the rim 28 and therefore assume a normally straight condition. As will become significant hereinafter, the guide members on either side of the reel hub 19 extend therefrom in parallel spaced relation and are arranged by pairs which respectively operate to guide the winding of the different width filmstrips 32 and 33 onto such hub about a common centering point 43 located on the winding axis 38 intermediate the reel flanges 20 and 21. Each of the guide members forming a particular pair are separately attached to the reel hub at respective locations equidistant in opposite axial directions from the intermediate axial point 43 (and the corresponding snubber member 36*a* or 36*b*) and are spaced apart by a distance slightly greater than the width of a corresponding one of the filmstrips 32 and 33. For example, by reference to FIG. 2, it can be seen that the pair of guide members 39*a*, 42*a* is attached to the reel hub 19 at locations equidistant above and below from the centering point 43 (and the corresponding snubber member 36*a*). These locations are separated by a vertical distance slightly greater than the width of the 16mm filmstrip 33; whereupon, the 16mm filmstrip can be received between the pair of guide members 39*a*, 42*a* in edge-guiding relation therewith. Similarly, it can further be seen from FIG. 2, that the pair of guide members 39*b*, 42*b* is likewise arranged on the reel hub 19 to receive the 16mm filmstrip in edge-guiding relation. And in a corresponding manner, the pair of guide members 40*a*, 41*a* and the pair of guide members 40*b*, 41*b* are axially disposed on opposite sides of the reel hub 19 so as to respectively receive the 8mm filmstrip 32 in edge-guiding relation.

Figure 3:
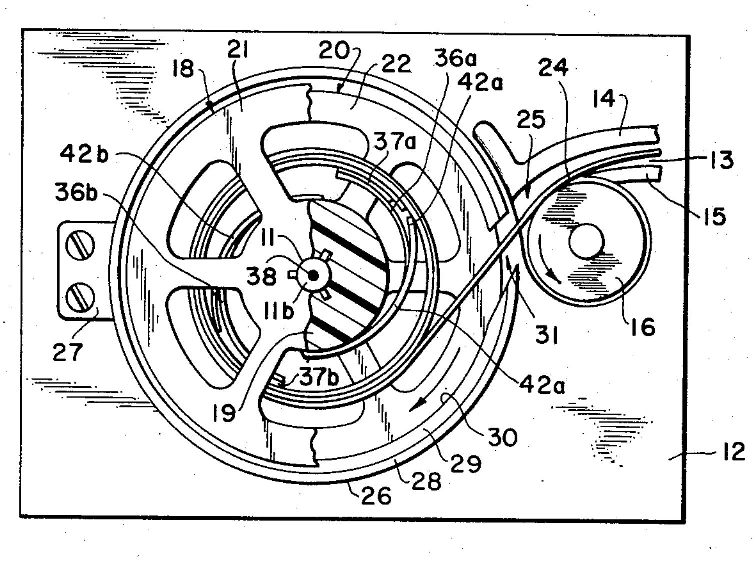
FIG. 3 is a plan view similar to FIG. 1 showing the position of the snubber member and the pairs of guide members when the wide strip, such as a 35mm filmstrip, is wound onto the reel.

Upon entering between the flanges 20 and 21 of the rotating take-up reel 18 through opening 31 in the cylindrical rim 28, the leading end of the 35mm filmstrip 24 is engaged by the friction pads 37*a* and 37*b* of the snubber members 36*a* and 36*b* and thereby guided in a clockwise direction along the inner cylindrical surface 30, see FIG. 3. Due to the high coefficient of friction between the friction pads 37*a* and 37*b* and the filmstrip material, the 35mm filmstrip tends to adhere to one or both pads and is drawn toward the reel hub 19 as the corresponding tension developed in the snubber members 36*a* and 36*b* produces an inwardly directed force component on the friction pads 37*a* and 37*b*. Accordingly, the flexible snubber members are wrapped about the reel hub under the resulting strip convolution. With reference to FIG. 3, which shows the 35mm filmstrip 24 in the process of being secured to the reel hub 19, it will be seen that the strip guide members 39*a*, 39*b*, – 42*a*, 42*b* are engaged by the inner surface of such filmstrip in much the same manner as the snubber members 36*a* and 36 *b* and are likewise wrapped about the reel hub beneath the developing strip roll. It will be apparent, however, that the 35mm filmstrip 24 is guided laterally between the opposed inner surfaces 22 and 23 of the reel flanges 20 and 21, thereby obviating the need for the strip guide members to perform their corresponding function. Moreover, as the snubber members 36*a* and 36*b* are attached to the reel hub 19 at respective locations opposite the centering point 43 intermediate the reel flanges 20 and 21, the 35mm filmstrip 24 will be coiled in a manner such that the longitudinal center line C thereof is aligned about the intermediate axial location 43, as suggested by FIG. 2.

As successive convolutions of the 35mm filmstrip 24 are developed about the reel hub 19, they further constrain the innermost convolution which is engaged by the friction pads 37*a* and 37*b;* thereby causing the leading end portion of the 35mm filmstrip to be wrapped progressively tighter until the snubber members 36*a* and 36*b* become wound tightly around the reel hub beneath the innermost convolution of the resulting strip roll. When this condition occurs, the friction pads 37*a* and 37*b* are compressed tightly against the 35mm filmstrip 24 so as to secure the developing filmstrip roll in frictional engagement with the reel hub member 19. Accordingly, it will be apparent that the take-up reel 18 can no longer be rotated in a winding direction at a speed which will cause the 35mm filmstrip to be absorbed faster than it is provided by a supply reel (not shown). Therefore, the gear and clutch unit 35 is provided with a friction clutch, not shown, which is adapted to slip at a predetermined torque so that the tension in the 35mm filmstrip 24 between the supply and take-up reels allows the take-up reel 18 to rotate only as fast as dictated by the corresponding drive means controlling the unwinding rotation of the supply reel.

Figure 4:
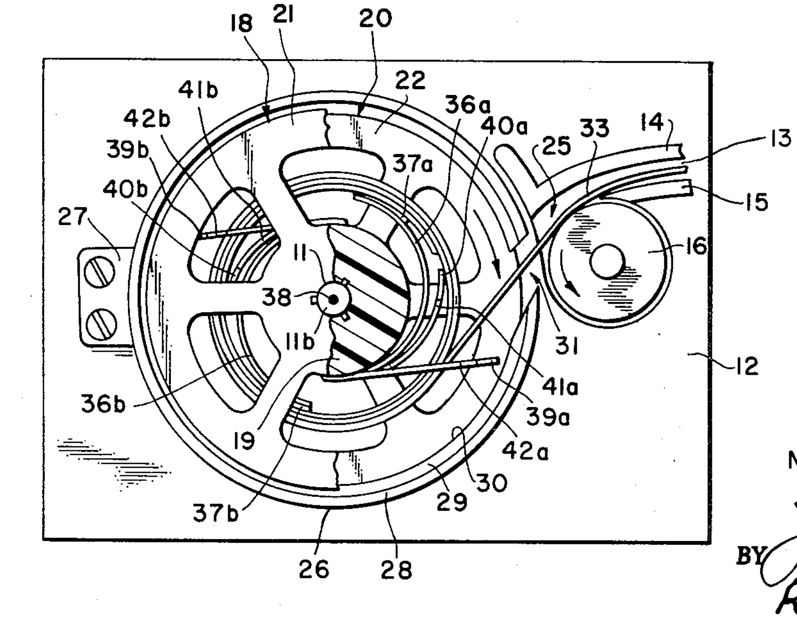
FIG. 4 is a plan view similar to FIG. 3 and shows the intermediate strip, such as a 16mm filmstrip, guided and engaged respectively by a corresponding pair of guide members and the snubber member as such strip is wound onto the reel.
Figure 5:
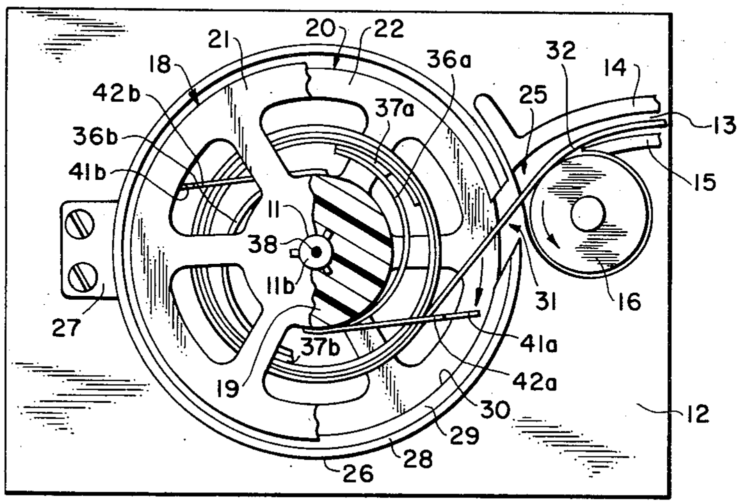
FIG. 5 is a plan view similar to FIG. 3 and shows the narrow strip, such as an 8mm filmstrip, guided and engaged respectively by a corresponding pair of guide members and the snubber member as such strip is wound onto the reel.

When the leading end of either the 16mm filmstrip 33 or the 8mm filmstrip 32 is fed through rim opening 31 as respectively shown in FIGS. 4 and 5, the strip centering means 17 will operate to introduce the filmstrip end between the flanges 20 and 21 of the rotating take-up reel 18 in a manner such that the filmstrip center line C will extend intermediate such flanges and through the centering point 43 (FIG. 2); whereupon, the introduced filmstrip end will be engaged by one or both of the friction pads 37*a* and 37*b* and can be secured to the reel hub 19 by the snubber members 36*a* and 36*b* in much the same way as previously described with respect to the 35mm filmstrip 24. However, as the 16mm and 8mm filmstrips are of widths narrower than the axial spacing between the reel flanges 20 and 21, these flanges are ineffective to maintain successive convolutions of the resulting strip roll in lateral alignment. Therefore, in the absence of other strip edge-guiding surfaces for laterally maintaining alignment of the successive filmstrip convolutions, the inherent curl of the filmstrip and the influence of the snubber members 36*a* and 36*b* would almost certainly result in overlapping misalignment of successive filmstrip convolutions about the reel hub 19. Even worse, however, is the possibility of the outermost convolution slipping entirely off the strip roll and becoming jammed into a space adjacent the reel flanges 20 and 21; in which case, the 16mm or 8mm filmstrip would inevitably be seriously damaged as a result of the accompanying twisting and kinking to which it would be subjected.

To avoid such occurrences, the guide member pairs 39*a*, 42*a* and 39*b*, and 42*b* are adapted to receive the 16mm filmstrip 33 in edge-guiding relation upon entry between the reel flanges 20 and 21, as previously described, to guide the winding of such filmstrip onto the reel hub 19 about the centering point 43, see FIGS. 2 and 4. During this winding, the guide member pairs 40*a*, 41*a* and 40*b*, 41*b* are wound beneath the resulting strip roll and onto the reel hub 19 since the guide members in these pairs are axially spaced from each other by a distance less than the width of the 16mm filmstrip. Likewise, the snubber members 36*a* and 36*b* are wound beneath the resulting strip roll and onto the reel hub 19 about the centering point 43. Therefore, it will be appreciated from the description hereinbefore that the 16mm filmstrip 33 will be coiled in a manner such that the longitudinal center line C thereof is aligned about the centering point 43, see FIG. 2. Alternatively, in the example of the 8mm filmstrip 32, the guide member pairs 40*a*, 4*a* and 40*b*, 41*b* are similarly adapted to receive such filmstrip in edge-guiding relation upon initial entry between the reel flanges 20 and 21, to guide the same for winding onto the reel hub 19 about the centering point 43 in the manner shown by FIGS. 2 and 5. Since the 16mm and 8 mm filmstrips are of widths slightly narrower than the axial spacing between corresponding pairs of guide members, those guide members of a corresponding pair remain in their tangential positions throughout the filmstrip winding operation, thereby insuring that all of the filmstrip convolutions wound onto the reel hub remain in relative lateral alignment, see FIGS. 4 and 5.

Although the roll of filmstrip on the take-up reel 18 is securely attached to the reel hub member 19 during the filmstrip winding operation, it should be apparent that the filmstrip readily separates from such hub when the filmstrip subsequently has been unwound from the take-up reel. Thereupon, the resiliently flexible snubber and guide members return automatically to their former positions so that the take-up reel is again in condition to accept a filmstrip of the same or another width during a succeeding filmstrip threading operation, see FIG. 1.

In place of the friction pads 37*a* and 37*b* employed in the illustrative preferred embodiment of the present invention to engage a web-like strip with the snubber members 36*a* and 36*b*, one or more teeth could be provided at the outer end of a similar snubber member to perform the same function in apparatus designed to accept only those kind of strips which include marginal perforations engageable by such teeth. Furthermore, it should be recognized that the present invention can be adapted readily to provide a self-threading strip take-up reel or hub capable of receiving web-like strips of only two widths or of more than the illustrated three widths, simply by providing the required number of strip guide members in appropriate axial relation about the snubber members, and that the reel can be modified to operate as a self-threading strip take-up hub by omitting the reel flanges 20 and 21. For example, if the reel or hub is to receive only two widths of web-like strips, each bifurcated element need only comprise a single pair of strip guide members and a single snubber member.

It will now be appreciated by those having ordinary skill in the art that a novel self-threading strip take-up device has been disclosed which is capable of receiving strips of different widths and which is adapted to receive these strips in a manner such that their corresponding longitudinal center lines are respectively coiled about a common centering point on the winding axis of the device regardless of differences in the strip width.

The present invention has been described in considerable detail with particular reference to a preferred embodiment thereof, but it will be understood that variations and modifications can be effected within the spirit and scope of such invention.

I Claim:

1. A strip take-up device adapted to receive a plurality of elongate strips respectively of different widths, with each such strip having a longitudinal center line, said device comprising:

a hub having a winding axis about which such different width strips can be respectively coiled; and a plurality of pairs of strip guide means attached to said hub in axially spaced relation, each of said strip guide means which form a particular pair being respectively disposed on said hub at substantially equal distances in opposite axial directions from a common point on said hub axis and being spaced apart on said hub by a distance slightly greater than the width of a respective one of such different width strips for guiding the one strip for winding about said hub centered on such common axial point, whereby the longitudinal center line of anyone of such different width strips which is wound about said hub will be aligned with respect to such common axial point.

2. A strip take-up device as recited in claim 1, wherein each of said strip guide means which form a particular pair includes a resiliently flexible strip guide finger extending from said hub member for winding onto said hub member about said axis thereof.

3. A strip take-up device adapted to receive a plurality of elongate strips respectively of different widths, with each such strip having a leading end and a longitudinal center line, said device comprising:

a hub member having a winding axis about which such different width strips can be respectively coiled;

means, attached to said hub member, for respectively securing the leading ends of such different width strips to said hub member at a location adjacent a predetermined point on said hub member axis; and a plurality of pairs of strip guide means attached to said hub member in axially spaced relation, each of said strip guide means which form a particular pair being respectively disposed on said hub member at substantially equal distances in opposite axial directions from such predetermined point and being spaced apart on said hub member by a distance slightly greater than the width of a respective one of such different width strips for guiding the one strip for winding about said hub member centered on such predetermined point, whereby the longitudinal center line of anyone of such different width strips which is wound about said hub member will be aligned with respect to such predetermined point.

4. A strip take-up device as recited in claim 3, wherein said strip securing means includes a resiliently flexible snubber finger attached to said hub member and extending from said hub member in generally tangential relation for winding of said snubber finger onto said hub member about such predetermined point, whereby said snubber finger will be wound beneath a respective one of such different width strips upon winding of the one strip about said hub member centered on such predetermined point.

5. A strip take-up device as recited in Claim 4, wherein each of said strip guide means which form a particular pair includes a resiliently flexible strip guide finger extending from said hub member in generally tangential relation for winding onto said hub member about said axis thereof, whereby those paired strip guide fingers which are axially spaced from each other a distance less than the width of a respective one of such different width strips will be wound beneath the one strip upon winding of the same about said hub member centered on such predetermined point.

6. A strip take-up reel for at least first and second elongate strips respectively of different widths, the width of the first strip being greater than the width of the second strip and each of such strips having a leading end, said reel comprising:

a hub member for receiving thereon in a winding direction either of such first and second strips and having a longitudinal axis about which such strips can be respectively wound;

a pair of flange members axially disposed on said hub member in spaced opposed relation, said flange members being spaced apart from each other by a distance slightly greater than the width of such first strip to guide the same for winding onto said hub member;

a pair of flexible guide members attached to said hub member in axially spaced relation and extending therefrom between said flange members, said guide members being respectively disposed on said hub member at substantially equal distances in opposite axial directions from a point on said hub member axis substantially intermediate said flange members and said guide members being spaced from each other by a distance slightly greater than the width of such second strip to guide the same for winding about said hub member centered on such intermediate axial point; and flexible snubber means, attached to said hub member and extending therefrom between said flange members, for respectively securing the leading end of either of such first and second strips to said hub member at a location opposite such intermediate axial point.

7. A strip take-up reel as recited in claim 6, wherein said snubber means and said guide members respectively comprise fingers of substantially thin cross section for winding of said fingers onto said hub member about said axis thereof.

8. A strip take-up reel as recited in Claim 7, wherein said snubber means finger is disposed on said hub member at a location opposite such intermediate axial point and projects from said hub member in generally tangential relation for winding about such intermediate axial point, whereby said snubber means finger is wound beneath either of such first and second strips upon winding of the same about said hub member.

9. A strip take-up reel as recited in claim 8, wherein said snubber means further includes strip engaging material having a surface of relatively high coefficient of friction with respect to either of such first and second strips to be wound onto said hub member.

10. A strip take-up reel as recited in claim 8, wherein said guide member fingers project from said hub member in generally tangential relation thereto and extend substantially parallel to each other, whereby said guide member fingers are wound beneath such first strip upon winding of the same about said hub member.

11. A self-threading strip take-up reel for at least first and second strips respectively of different widths, the width of the first strip being greater than the width of the second strip and each of such strips having a leading end, said reel comprising:

a generally cylindrical hub member for receiving thereon in a winding direction either of such first and second strips and having an axis about which such strips can be respectively wound;

a pair of generally circular flange members axially disposed on said hub member in substantially parallel spaced relation, said flange members being spaced apart from each other by a distance slightly greater than the width of such first strip to guide the same for winding onto said hub member;

a flexible snubber member attached to said hub member at a location opposite a point on said hub member axis substantially intermediate said flange members, said snubber member extending tangentially from said hub member and between said flange members for winding onto said hub member about such intermediate axial point;

means disposed on said snubber member for engaging the leading end of either of such first and second strips; and a pair of flexible guide members attached to said hub member in axially spaced relation and extending tangentially therefrom between said flange members for winding onto said hub member, said guide members being respectively disposed on said hub member at substantially equal distances in opposite axial directions from such intermediate axial point and being spaced apart from each other by a distance slightly greater than the width of such second strip to guide the same for winding about said hub member centered on such intermediate axial point.

12. A self-threading strip take-up reel as recited in claim 11, further comprising a plurality of pairs of flexible guide members and a plurality of flexible snubber members, the number of said snubber members being equal to the number of pairs of said guide members and said guide and snubber members being equiangularly spaced about said hub member.

* * * * *